(12) United States Patent
Kagaya et al.

(10) Patent No.: US 10,956,717 B2
(45) Date of Patent: Mar. 23, 2021

(54) COLLATOR AND METHOD FOR DISPLAYING RESULT OF COLLATION

(71) Applicant: PANASONIC INTELLECTUAL PROPERTY MANAGEMENT CO., LTD., Osaka (JP)

(72) Inventors: Tomoyuki Kagaya, Kanagawa (JP);
Katsuji Aoki, Kanagawa (JP);
Takayuki Matsukawa, Kanagawa (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 214 days.

(21) Appl. No.: 16/319,904

(22) PCT Filed: Jul. 24, 2017

(86) PCT No.: PCT/JP2017/026618
§ 371 (c)(1),
(2) Date: Jan. 23, 2019

(87) PCT Pub. No.: WO2018/030129
PCT Pub. Date: Feb. 15, 2018

(65) Prior Publication Data
US 2019/0266389 A1      Aug. 29, 2019

(30) Foreign Application Priority Data
Aug. 8, 2016  (JP) .............................. JP2016-155835

(51) Int. Cl.
*G06K 9/00*       (2006.01)
*G06T 7/00*       (2017.01)
*G06F 16/00*      (2019.01)

(52) U.S. Cl.
CPC ......... *G06K 9/00281* (2013.01); *G06F 16/00* (2019.01); *G06K 9/00268* (2013.01); *G06K 9/00288* (2013.01); *G06T 7/00* (2013.01)

(58) Field of Classification Search
CPC ........... G06K 9/00281; G06K 9/00268; G06K 9/00288; G06K 9/0095; G06T 7/00; G06F 16/00
(Continued)

(56) References Cited

U.S. PATENT DOCUMENTS

2001/0031073 A1* 10/2001 Tajima ............... G06K 9/00288
                                                             382/118
2003/0161504 A1    8/2003 Inoue
(Continued)

FOREIGN PATENT DOCUMENTS

JP    2000-306095    11/2000
JP    2005-149370    6/2005
(Continued)

OTHER PUBLICATIONS

The Extended European Search Report dated Jun. 12, 2019 for European Patent Application No. 17839202.3.
(Continued)

*Primary Examiner* — Ali Bayat
(74) *Attorney, Agent, or Firm* — Greenblum & Bernstein, P.L.C.

(57) ABSTRACT

A collator includes at least one processor and a storage unit storing a plurality of registered face images, the processor performs a partial collation for collating a feature quantity of a first target area excluding partial areas in each of the plurality of registered face images with a feature quantity of a second target area excluding a partial area in a search face image to be searched, and displays a result of the partial collation.

21 Claims, 9 Drawing Sheets

(58) Field of Classification Search
USPC .......................................................... 382/118
See application file for complete search history.

(56) References Cited

U.S. PATENT DOCUMENTS

| | | | | |
|---|---|---|---|---|
| 2011/0311112 | A1* | 12/2011 | Matsuyama | G06K 9/00281 382/118 |
| 2013/0039590 | A1* | 2/2013 | Yoshio | G06K 9/6234 382/218 |
| 2013/0243278 | A1* | 9/2013 | Saito | G06K 9/6247 382/128 |
| 2014/0270370 | A1* | 9/2014 | Saito | G06K 9/00288 382/103 |
| 2015/0339516 | A1* | 11/2015 | Yano | G06T 7/194 382/118 |
| 2018/0197044 | A1* | 7/2018 | Wu | G06K 9/6232 |

FOREIGN PATENT DOCUMENTS

| | | |
|---|---|---|
| JP | 2012-003623 | 1/2012 |
| JP | 2014-086042 | 5/2014 |

OTHER PUBLICATIONS

Official Communication issued in International Pat. Appl. No. PCT/JP2017/026618, dated Oct. 17, 2017.

\* cited by examiner

| REGISTERED FACE ID | 1 | FEATURE QUANTITY 1 | 30 | ABNORMALITY DETERMINATION | 0 | AREA | RIGHT EYE |
|---|---|---|---|---|---|---|---|
| | | ... | ... | ... | ... | ... | ... |
| | | FEATURE QUANTITY $N_1$ | 500 | ABNORMALITY DETERMINATION | 1 | AREA | MOUTH |
| REGISTERED FACE ID | 2 | FEATURE QUANTITY 1 | 400 | ABNORMALITY DETERMINATION | 1 | AREA | RIGHT EYE |
| | | ... | ... | ... | ... | ... | ... |
| | | FEATURE QUANTITY $N_1$ | 10 | ABNORMALITY DETERMINATION | 0 | AREA | MOUTH |
| ... | | | | | | | |
| REGISTERED FACE ID | $N_2$ | FEATURE QUANTITY 1 | 300 | ABNORMALITY DETERMINATION | 1 | AREA | RIGHT EYE |
| | | ... | ... | ... | ... | ... | ... |
| | | FEATURE QUANTITY $N_1$ | 10 | ABNORMALITY DETERMINATION | 0 | AREA | MOUTH |

| AREA PATTERN | RIGHT EYE | LEFT EYE | NOSE | RIGHT MOUTH END | LEFT MOUTH END | ⋮ |
|---|---|---|---|---|---|---|
| $P_0$ | ○ | ○ | ○ | ○ | ○ | ⋮ |
| $P_1$ | × | × | ○ | ○ | ○ | ⋮ |
| $P_2$ | ○ | ○ | ○ | × | × | ⋮ |
| $P_3$ | × | ○ | ○ | × | ○ | ⋮ |
| ⋯ | ⋯ | ⋯ | ⋯ | ⋯ | ⋯ | |

FIG. 10

COLLATOR AND METHOD FOR DISPLAYING RESULT OF COLLATION

TECHNICAL FIELD

The present disclosure relates to a collator and a method for displaying a result of collation.

BACKGROUND ART

PTL 1 discloses a face image collation and search system that can perform a collation process in a case where an imaging environment, conditions, and the like of an input image and a registered image are different. In the face image collation and search system, a registered image of a user is registered in a registered image DB in advance. In an authentication process, a face image of the user imaged by a camera is analyzed, environmental parameters and the like are estimated, and the collation image adjusted based on the estimated parameters and the registered image are compared and collated.

CITATION LIST

Patent Literature

PTL 1: Japanese Patent Unexamined Publication No. 2000-306095

SUMMARY OF THE INVENTION

Technical Problem

An aspect of the present disclosure is to provide a collator and a method for displaying a result of collation capable of displaying a search result with high reliability.

Solutions to Problem

According to an aspect of the present disclosure, there is provided a collator including: at least one processor; and a storage unit that stores a plurality of registered face images, in which the processor performs a partial collation for collating a feature quantity of a first target area excluding a partial area in each of the plurality of registered face images with a feature quantity of a second target area excluding a partial area in a search face image to be searched, and displays a result of the partial collation.

According to another aspect of the present disclosure, there is provided a method for displaying a result of collation, the method including: performing a partial collation for collating a feature quantity of a first target area excluding a partial area in each of a plurality of registered face images with a feature quantity of a second target area excluding a partial area in a search face image to be searched; and displaying a result of the partial collation.

Advantageous Effects of Invention

According to the aspects of the present disclosure, it is possible to display the search results with high reliability.

Further advantages and effects in the aspects of the present disclosure will be apparent from the description and the drawings. Such benefits and/or advantages are provided by some embodiments and features described in the specification and the drawings, respectively, but it is to be understood that not necessarily all is provided to obtain one or more of the same features.

DESCRIPTION OF EMBODIMENTS

Embodiments will be described in detail below with reference to the drawings as appropriate. However, detailed explanation may be omitted more than necessary. For example, detailed explanations of already well-known matters and redundant explanation on substantially the same configuration may be omitted. This is to avoid the unnecessary redundancy of the following description and to facilitate understanding by those skilled in the art.

Note that, the accompanying drawings and the following description are provided to enable those skilled in the art to sufficiently understand the present disclosure, and are not intended to limit the claimed subject matter by these.

Embodiment

[1. Configuration]

Figure 1:
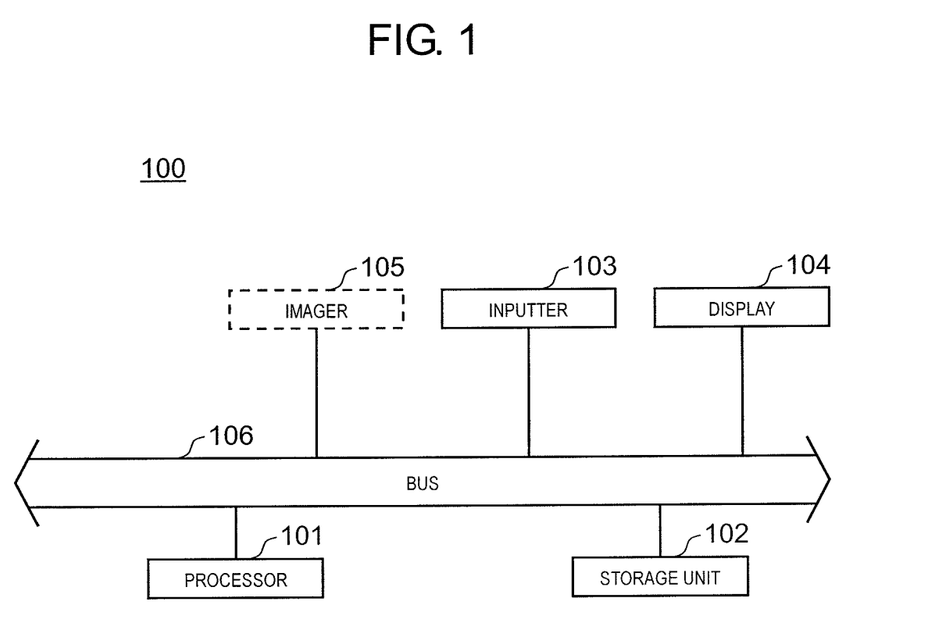
FIG. 1 is a block diagram showing an overall configuration of a collator according to an embodiment.

FIG. 1 is a block diagram showing an overall configuration of collator 100 according to an embodiment. Collator 100 is applied to, for example, an entry/exit management system for managing whether or not a person to be searched has entered or exited a facility and the like by collating a plurality of face images acquired from images in which a surveillance camera installed in the facility images (hereinafter, referred to as population face image) with a face image of the person to be searched (hereinafter, referred to as search face image), and by searching the search face image from the population face image.

Collator 100 has a configuration in which processor 101, storage unit 102, inputter 103, display 104 and imager 105 are connected by bus 106.

Various data for performing a collation process in collator 100 are stored in storage unit 102. The data stored in storage unit 102 is acquired via inputter 103.

Inputter 103 is, for example, an interface that is connected with an external device and acquires various data for performing the collation process in collator 100.

Display 104 is, for example, a liquid crystal display and the like. Display 104 displays the result of the collation process performed by processor 101.

Imager 105 is, for example, a camera that images an image including a face image and the like. Collator 100 in the present embodiment may not have imager 105.

Processor 101 performs an overall process of collator 100 including the collation process in collator 100.

[2. Operation of Collation Process]

Figure 2:
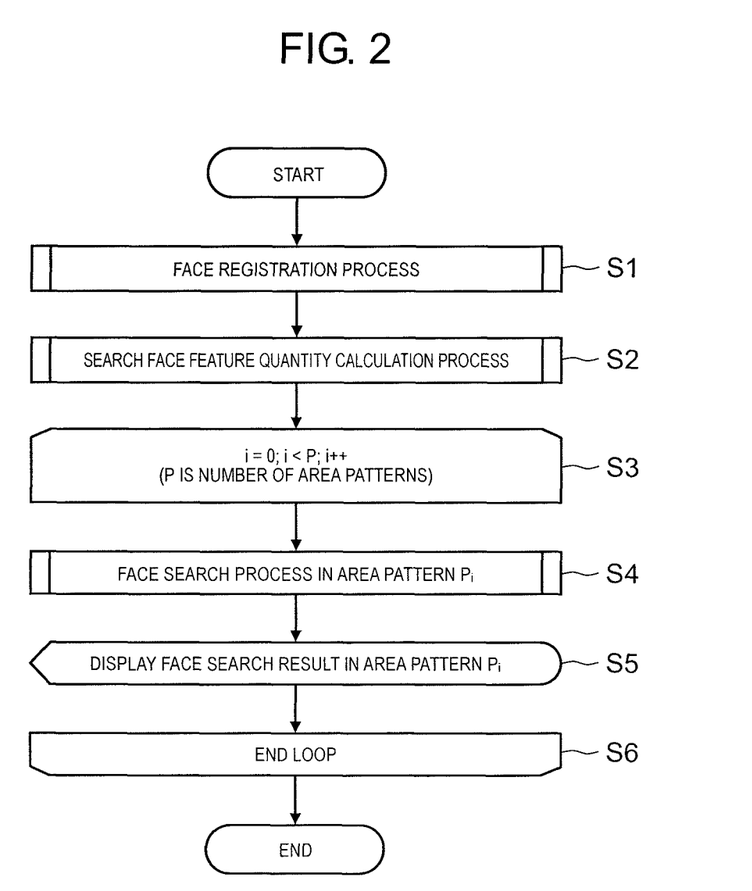
FIG. 2 is a flowchart showing an example of a collation process.

Next, the flow of the collation process performed by processor 101 of collator 100 will be described with reference to FIG. 2. FIG. 2 is a flowchart showing an example of the collation process. Details of each process with reference to FIG. 2 will be explained later.

In step S1, processor 101 performs a face registration process. The face registration process is a process of registering the population face image acquired via inputter 103. Processor 101 may acquire the population face image acquired by imager 105. The method for acquiring the population face image is not limited to these.

In step S2, processor 101 performs a process of calculating a feature quantity of the search face image (hereinafter, referred to as search face feature quantity). Processor 101 may acquire the search face image via inputter 103 or may acquire the search face image imaged by imager 105. The method for acquiring the search face image is not limited to these.

In step S3, processor 101 starts an iterative process for each area pattern. The area pattern is a prepared pattern in advance, and indicates an area to be collated. Details of the area pattern will be described later.

In the iterative process starting from step S3, processor 101 repeatedly performs step S4 and step S5 while setting an initial value of an index i to 0 and adding 1 to i during the condition i<P is satisfied, that is, until i becomes P or more. Then, in a case where i becomes P or more, the loop of the iterative process ends in step S6. P is a number of area patterns, and an integer of 1 or more. By the iterative process, processor 101 performs step S4 and step S5 for each P area patterns from pattern $P_0$ to $P_{P-1}$.

More specifically, processor 101 performs a face search process in the area pattern $P_i$ (i is an integer of 0 or more and P−1 or less) in step S4. In step S5, processor 101 displays a result of the face search process in the area pattern $P_i$ performed in step S4 on display 104.

That is, in the iterative process that starts in step S3 and ends in step S6, processor 101 performs the face search process for each P area patterns from area pattern $P_0$ to $P_{P-1}$ and displays the result of the performed face search process on display 104.

In step S6, the collation process ends when the loop of the iterative process ends.

[2-1. Face Registration Process]

Figure 3:
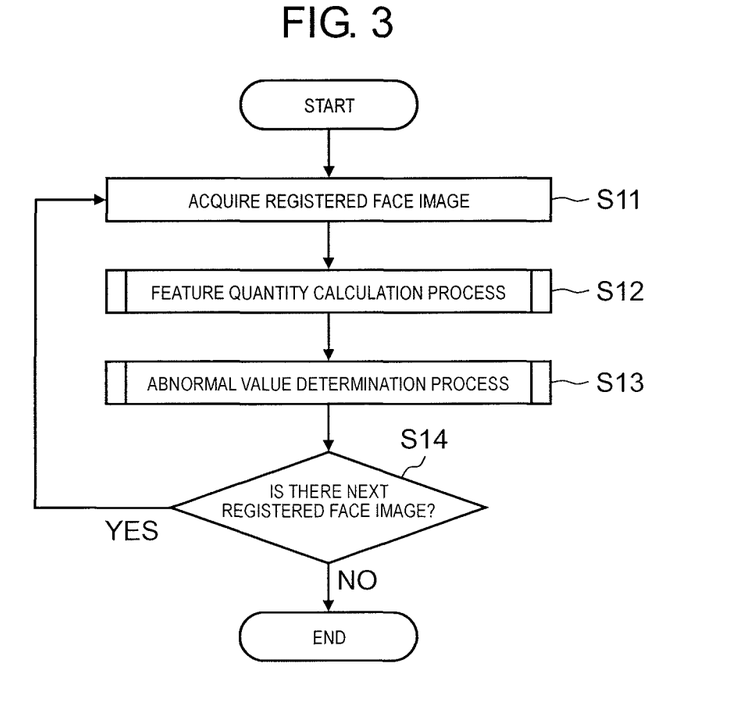
FIG. 3 is a flowchart showing an example of a face registration process.

Next, the face registration process shown in step S1 of FIG. 2 will be explained with reference to FIG. 3. FIG. 3 is a flowchart showing an example of the face registration process.

In step S11, processor 101 acquires a face image to be registered in the database from the population face image (hereinafter, referred to as registered face image). In step S12, processor 101 performs a process of calculating the feature quantity of the acquired registered face image. Next, processor 101 performs an abnormal value determination process of determining whether or not the calculated feature quantity is an abnormal value in step S13. Details of a feature quantity calculation process of step S12 and the abnormal value determination process of step S13 will be described later.

Next, processor 101 determines whether or not a next registered face image exists in the population face image in step S14.

In the case where the next registered face image exists (step S14: YES). the process proceeds to step S11.

In the case where the next registered face image does not exist (step S14: NO), the face registration process ends.

Processor 101 performs the feature quantity calculation process and the abnormal value determination process with respect to each population face image by the face registration process shown in FIG. 3. In the following description, the number of registered images by the face registration process is set to $N_2$ ($N_2$ is an integer of 1 or more).

[2-1-1. Feature Quantity Calculation Process]

Figure 4:
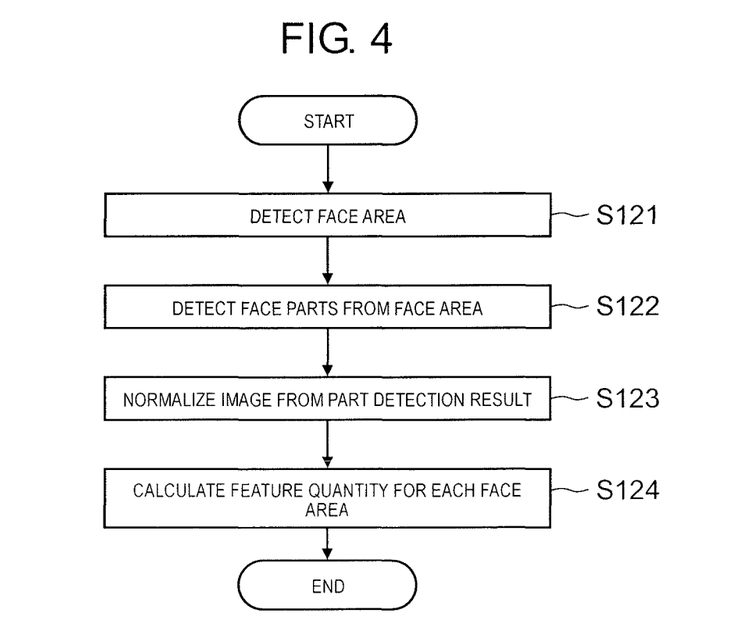
FIG. 4 is a flowchart showing an example of a feature quantity calculation process.

Next, the feature quantity calculation process shown in step S12 of FIG. 3 will be explained with reference to FIG. 4. FIG. 4 is a flowchart showing an example of the feature quantity calculation process.

First, processor 101 detects an area of a face (face area) from the entire image area in step S121. Processor 101 performs a detection process by applying a well-known face detection algorithm to the image. For example, processor 101 performs a face area detection process using a Haar-like feature and a boosting learning algorithm.

Next, processor 101 detects a face part from a face area in step S122. The face part is an element constituting a face such as a left eye, a right eye, a mouth, and a forehead. Processor 101 detects the face part by performing template matching between an average part image indicating an average shape and position of the face part and the face area detected in step S121. The detected face part is expressed as coordinate values of four points representing a rectangular area surrounding the parts in the face image. The representation form of the face part may not be the coordinate values of four points but may be another expression form.

Next, processor 101 normalizes an image from the detection result of the face part in step S123. For example, processor 101 performs a process such as cropping, magnification, reduction, and affine transformation of an image, and normalizes the image so that the face part detected in step S121 matches the reference size, and the face part detected in step S122 matches the same positions in the face area.

Next, processor 101 calculates the feature quantity of the face part for each face area in step S124. For example, processor 101 uses the position of face part as a reference, and calculates a feature quantity from the reference area. Since the image is normalized in the present embodiment, it is possible to calculate the feature quantity of each face part by assuming that a predetermined face part exists in prescribed areas and calculating the feature quantity for each prescribed area. The number of dimensions of feature quantity acquired by the calculation of feature quantity will be described by taking a right eye part as an example. When a feature quantity acquired from the right eye part is D_reye and a 128 dimensional SIFT feature quantity is calculated from the area of the height h and the lateral width w with the right eye as the center, the number of dimensions of the feature quantity of D_reye is w×h×128. As described above, images are normalized in the present embodiment. The feature quantity is calculated according to a common rule in each image. Therefore. the "i-th feature quantity" represents the feature quantity in the same area in each image.

In step S124, after processor 101 calculates the feature quantity, the feature quantity calculation process ends. The feature quantity used in the present embodiment is not limited to the SIFT feature quantity. The feature quantity may be any value indicating the feature quantity of the face. For example, in addition to the SIFT feature quantity, a Gabor feature quantity or the like may be used.

Processor 101 calculates the feature quantity of each face part in the face area of the image by the feature quantity calculation process shown in FIG. 4. In the following description, $N_1$ ($N_1$ is an integer of 1 or more) is defined as the number of dimensions of the feature quantity acquired by combining the feature quantity of each face part in series.

In the feature quantity calculation process shown in FIG. 4, the example in which processor 101 performs normalization on the entire face area of the image has been described in step S123. However, processor 101 may perform normalization on each face part instead of performing normalization on the entire face area.

The example in which processor 101 calculates the feature quantity in step S124 after performing normalization on the image in step S123 has been described. However, instead of performing the normalization on the image in step S123, the normalization may be performed when calculating the feature quantity in step S124. In that case, for example, processor 101 may change the method of calculating the SIFT feature quantity according to the size of the image in the step S124.

[2-1-2. Abnormal Value Determination Process]

Figure 5:
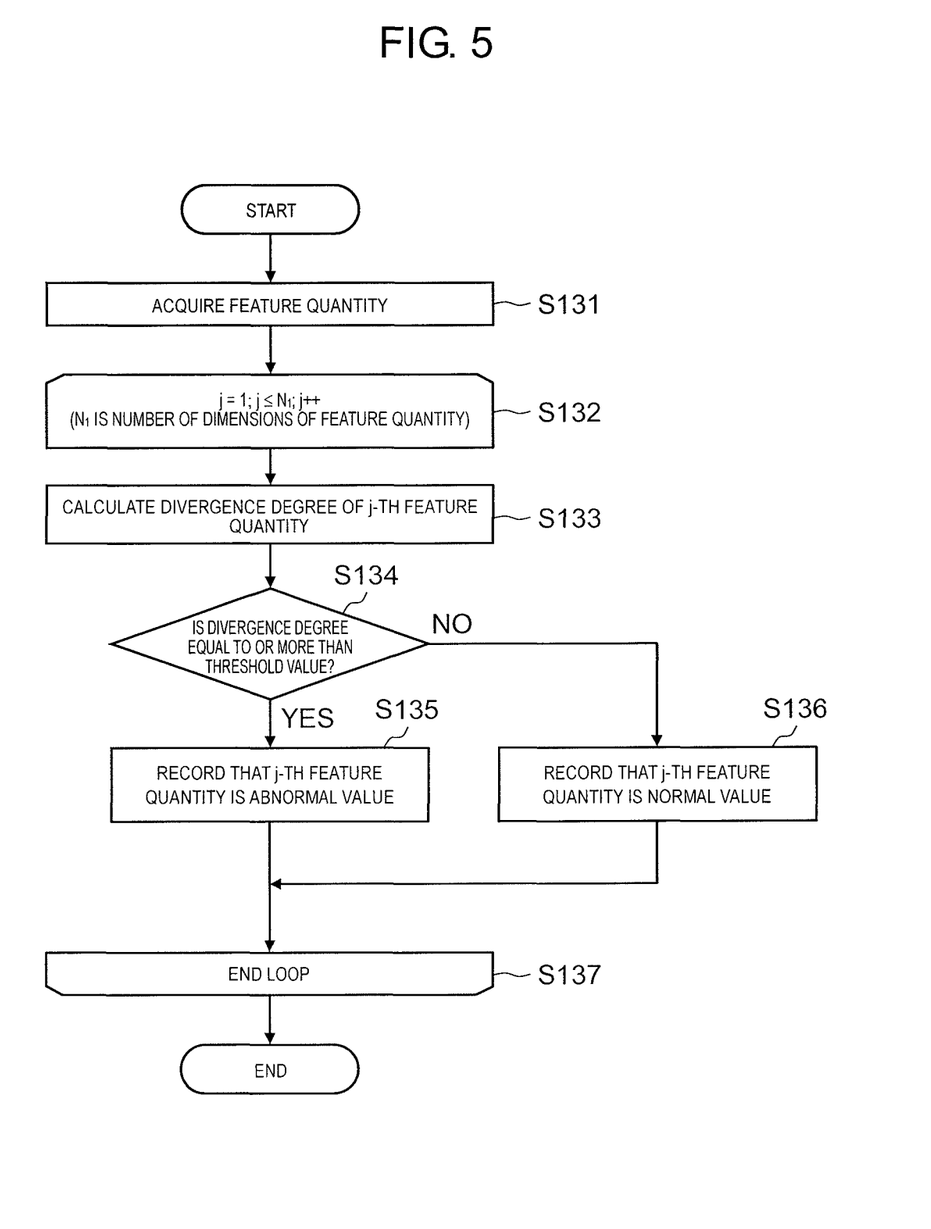
FIG. 5 is a flowchart showing an example of an abnormal value determination process.

Next, the abnormal value determination process shown in step S13 of FIG. 3 will be described with reference to FIG. 5. FIG. 5 is a flowchart showing an example of an abnormal value determination process. As described with reference to FIG. 3, the abnormal value determination process is performed after the feature quantity calculation process.

First, processor 101 acquires the feature quantities of number of dimensions $N_1$ calculated by the feature quantity calculation process in step S131.

Next, processor 101 starts an iterative process for each dimension of the feature quantity in step S132. In detail, while setting the initial value of an index j to 1 and adding 1 to j, while the condition of $j \leq N_1$ is satisfied, that is, the process of steps S133 to S136 described below is repeatedly performed on the j-th feature quantity until j becomes larger than $N_1$. In a case where j is larger than $N_1$, the loop of the iterative process ends in step S137.

Specifically, processor 101 calculates the divergence degree of the j-th feature quantity in step S133. The divergence degree is the degree of quantitatively expressing the difference from an arbitrary reference. For example, the divergence degree of the j-th feature quantity may be a difference from the average of the j-th feature quantity of an arbitrary data set or a deviation value. Here, an image acquired in an environment where imager 105 is used may be used as the arbitrary data set.

In the present embodiment, a set of many face images is used as a data set. Processor 101 calculates the divergence degree based on the distribution of the feature quantity of the face image acquired by learning for many sets of face images.

As an example, assume that $f_j$ be the value of the j-th feature quantity and the distribution $F_j$ be the distribution of the j-th feature quantity acquired by learning. Assuming that the average of the distribution $F_j$ is mean($F_j$) and the variance is var($F_j$), the divergence degree $D_j$ of the feature quantity $f_j$ is calculated by Expression (1).

$$D_j = \left| \frac{f_j - \text{mean}(F_j)}{\text{var}(F_j)} \right|$$

Expression (1)

Next, processor 101 determines whether or not the calculated divergence degree $D_j$ is equal to or more than a threshold value in step S134. For example, processor 101 may set the value of the threshold $3 \times \sigma_j$ as a threshold value using the standard deviation $\sigma_j$ of the distribution $F_j$.

In a case where the divergence degree $D_j$ of the j-th feature quantity is equal to or larger than the threshold value (YES in S134), processor 101 records that the j-th feature quantity is an abnormal value in step S135. In a case where the divergence degree $D_j$ of the j-th feature quantity is not equal to or larger than the threshold value (NO in S134), processor 101 records that the j-th feature quantity is a normal value in step S136.

When j exceeds $N_1$, the loop process ends in step S137, and the abnormal value determination process ends.

By the abnormal value determination process shown in FIG. 5, processor 101 calculates the divergence degree for each feature quantity of number of dimensions $N_1$ from the first feature quantity to the $N_1$-th feature quantity, determines whether or not the calculated result is an abnormal value based on the divergence degree, and records the determination result.

The example in which the divergence degree of the feature quantity is calculated for each dimension has been described. However, the present disclosure is not limited thereto. The divergence degree of the feature quantity may be calculated not for each dimension but for each of a plurality of dimensions or for each face part.

[2-1-3. Face Registration Process Result]

Figure 6:
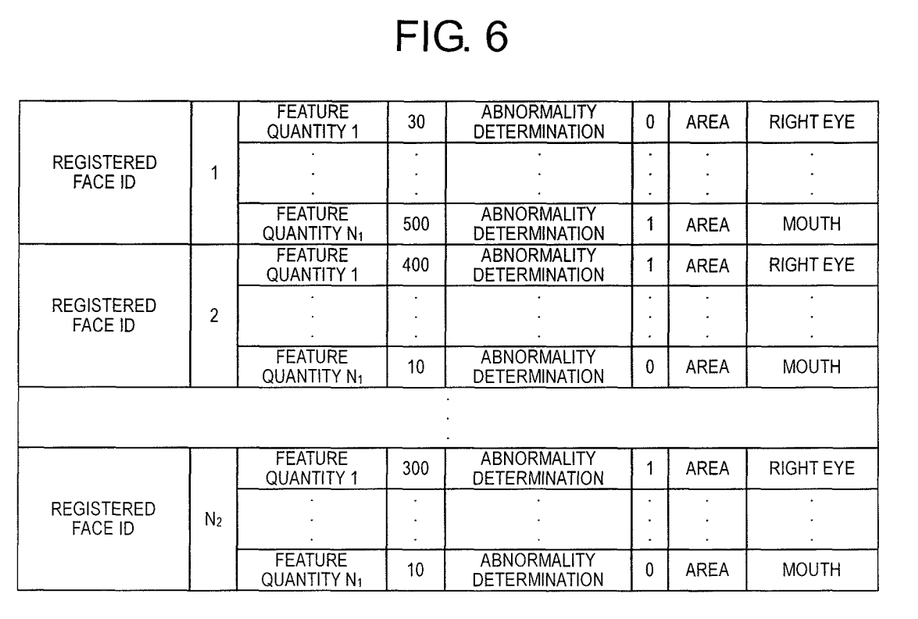
FIG. 6 is a table showing an example of a database of registered face images.

By the above-described face registration process, processor 101 calculates the feature quantities of number of dimensions $N_1$ in each of the $N_2$ registered face images and performs determination as to whether or not each feature quantity of number of dimensions $N_1$ is an abnormal value. An example of a database acquired by the face registration process will be described with reference to FIG. 6. FIG. 6 is a table showing an example of a database of registered face images.

In the example of FIG. 6, the result of face registration process is shown in a tabular form. Specifically, the values of the ID (registered face ID) allocated to each of the $N_2$ registered face images and the feature quantities of number of dimensions $N_1$ (from feature quantity 1 to feature quantity $N_1$) are shown. For each feature quantity from the feature quantity 1 to the feature quantity $N_1$, the result of the abnormality determination acquired by the abnormal value determination process and the face part corresponding to the feature quantity are shown. In a case where the feature quantity is a normal value (in a case where it is not an abnormal value), 0 is recorded as a result of the abnormality determination, and in a case where the feature quantity is an abnormal value, 1 is recorded as a result of the abnormality determination.

In FIG. 6, an example in which numbers from 1 to $N_2$ are allocated as registered face IDs has been shown, but the registered face IDs may include, for example, the identification number of the imaged camera, the date and time of imaging, the frame number of the image, and the like.

In the example of FIG. 6, 0 or 1 is recorded as the result of the abnormality determination, but, the divergence degree of each feature quantity calculated in the abnormality determination process may be recorded.

[2-2. Search Face Feature Quantity Calculation Process]

Figure 7:
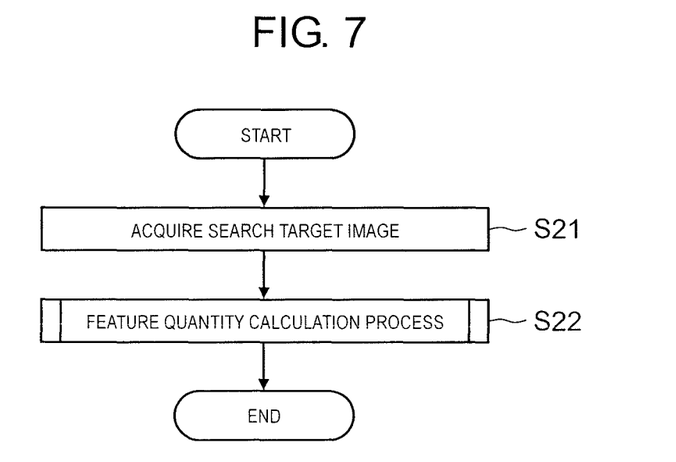
FIG. 7 is a flowchart showing an example of a search face feature quantity calculation process.

Next, the search face feature quantity calculation process shown in step S2 of FIG. 2 will be described with reference to FIG. 7. FIG. 7 is a flowchart showing an example of a search face feature quantity calculation process.

Processor 101 acquires the search face image in step S21. Next, processor 101 performs a process of calculating the feature quantity of the acquired search face image in step S22. The feature quantity calculation process in step S22 is the same as the feature quantity calculation process described with reference to FIG. 4, so description thereof will be omitted.

Processor 101 calculates the position of face part and the values of a plurality of feature quantities in the face area of search face image by the search face feature quantity calculation process shown in FIG. 7.

[2-3. Face Search Process]

Next, the face search process shown in step S4 in FIG. 2 will be described. As described above, the face search process is performed for each area pattern $P_i$. First, the area pattern will be described with reference to FIGS. 8 and 9.

Figure 8:
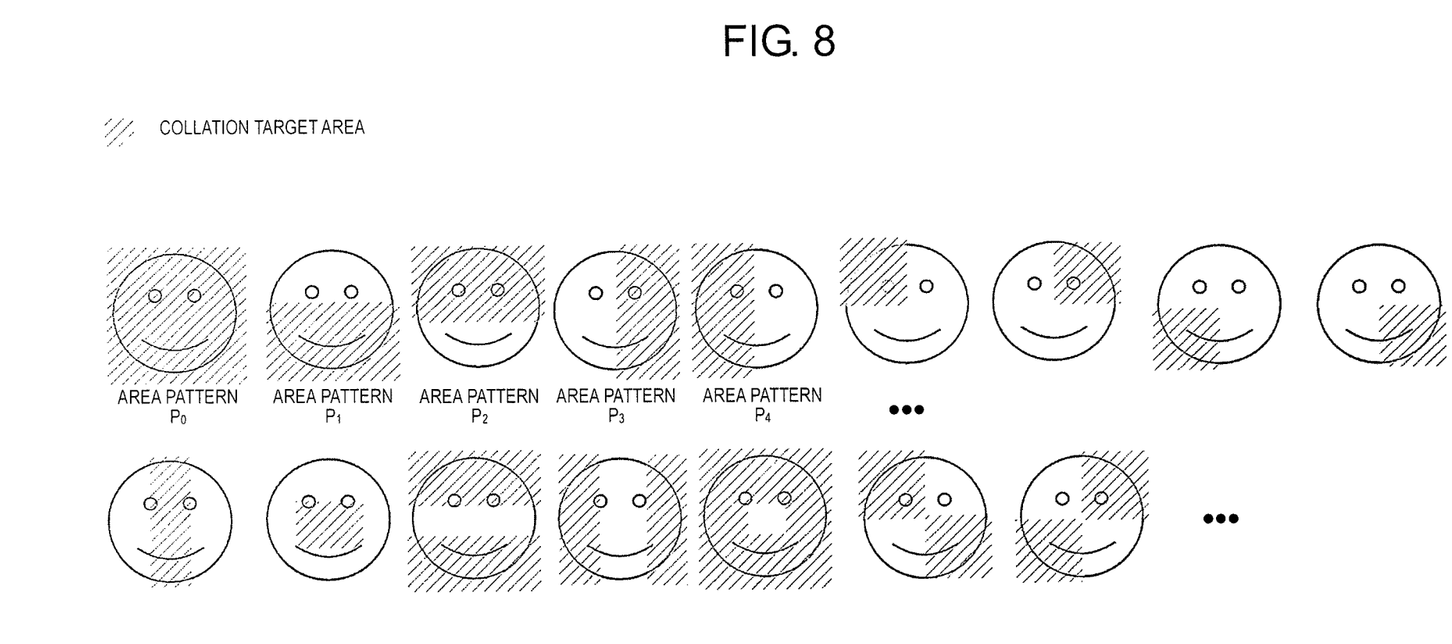
FIG. 8 shows an example of area patterns.

FIG. 8 shows an example of area patterns. As described above, the area pattern is a pattern prepared in advance, and represents an area (collation target area) to be collated. The area to be collated is an area of the entire face or an area excluding a partial area from the entire face. As shown in FIG. 8, in the area pattern $P_0$, the entire face is a collation target area. Each of the area patterns other than the area pattern $P_0$ is an area excluding different areas from the entire face.

For example, the area pattern $P_1$ is a lower part area obtained by horizontally dividing the entire face area into two parts and the area pattern $P_2$ is an upper part area obtained by horizontally dividing the entire face area into two parts. The area pattern $P_3$ is a right part area obtained by vertically dividing the entire face area into two parts and the area pattern $P_4$ is a left part area obtained by vertically dividing the entire face area into two parts.

Figure 9:
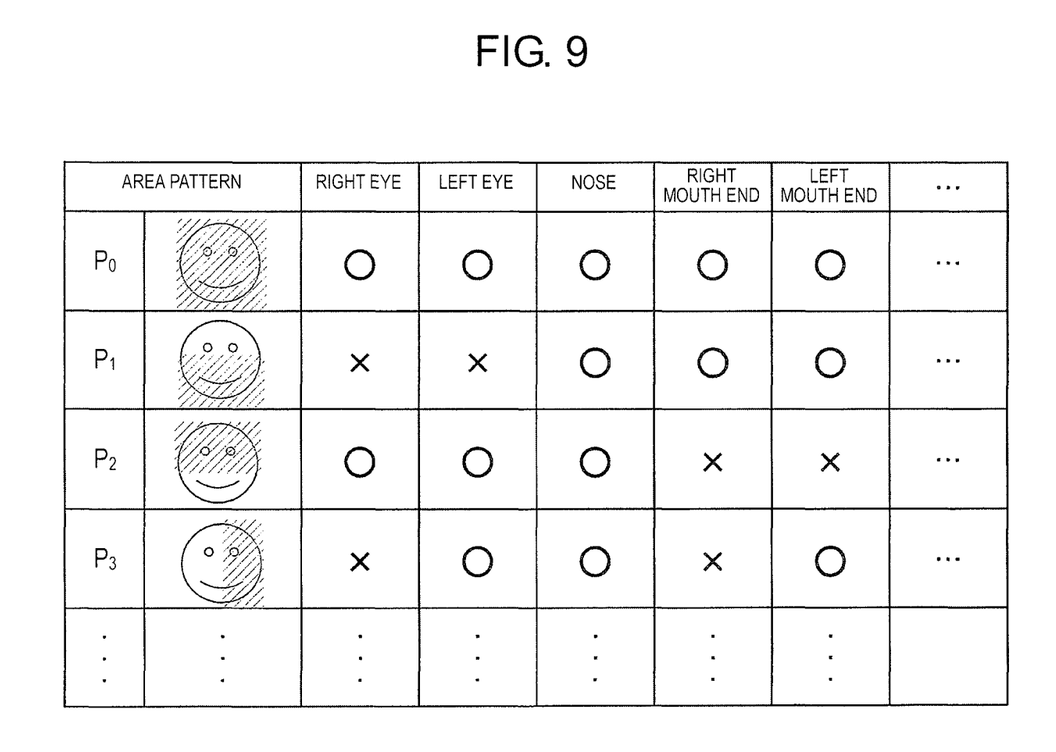
FIG. 9 is a table showing an example of correspondence relationship between the area patterns and face parts.

FIG. 9 is a table showing an example of correspondence relationship between area patterns and face parts. As shown in FIG. 9, area patterns other than the area pattern $P_0$ are areas each excluding different areas from the entire face. For example, the area pattern $P_1$ is an area excluding areas of the face parts of the right eye and the left eye from the entire face. Unlike the area pattern $P_1$, the area pattern $P_2$ includes areas of the face parts of the right eye and the left eye, but excludes the areas of the right mouth end and the left mouth end.

The correspondence relationship shown in FIG. 9 is used when performing the face search process in the area pattern $P_i$. Since there is a correspondence between the face part and the dimension of the feature quantity, it may be a correspondence relation between the area pattern and the dimension of the feature quantity instead of the correspondence relationship between the area pattern and the face parts shown in FIG. 9.

Figure 10:
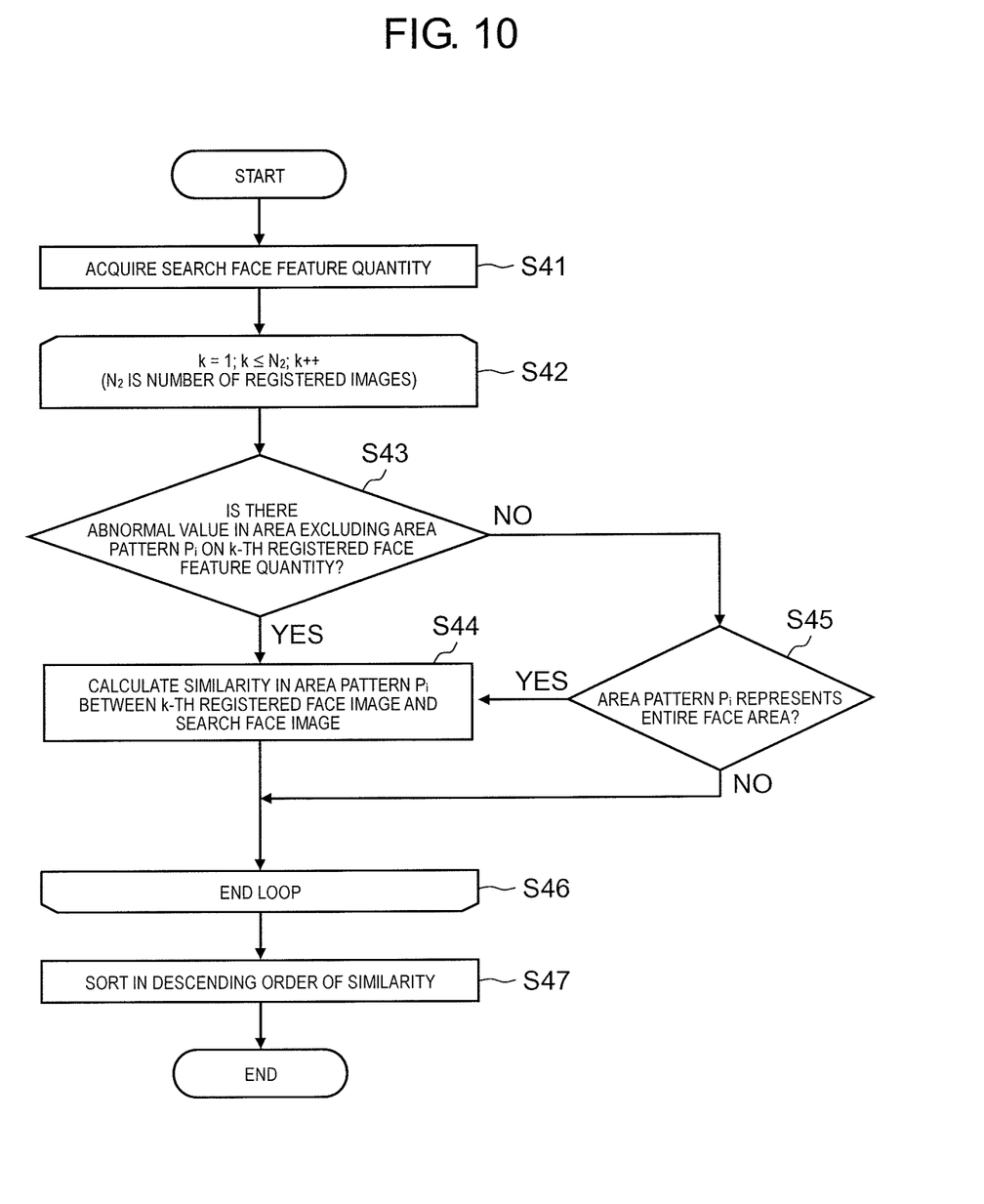
FIG. 10 is a flowchart showing an example of a face search process.

Next, the face search process will be described with reference to FIG. 10. FIG. 10 is a flowchart showing an example of the face search process.

In step S41, processor 101 acquires the feature quantity of the search face image.

Next, processor 101 starts an iterative process for each of the registered face images in step S42. In details, while setting an initial value of an index k as 1 and adding 1 to k, while the condition $k \leq N_2$ is satisfied, that is, until k becomes $N_2$ or more, the process of steps S43 to S45 described below is repeatedly performed on the k-th registered face image. When k is larger than $N_2$, the loop of the iterative process ends at step S46.

Specifically, processor 101 determines whether or not an abnormal value exists in the area excluding the area pattern $P_i$ in the feature quantity of the k-th registered face image in step S43. This determination is performed by referring to the database of registered face images shown in FIG. 6 and the correspondence relationship between the area patterns and face parts shown in FIG. 9.

With the area pattern $P_1$, k=2 as an example, the process of step S43 will be described. As shown in FIG. 9, in the area pattern $P_1$, the right eye and left eye are excluded from the areas to be collated. In the second registered face image shown in FIG. 6 (registered face image whose registered face ID is 2), it is shown that the feature quantity of the right eye area is an abnormal value. That is, in this example, processor 101 determines that an abnormal value exists in the area excluding the area pattern $P_1$ in the feature quantity of the second registered face image.

In a case where an abnormal value exists in the area excluding the area pattern $P_i$ (YES in S43), processor 101 calculates the similarity in the area pattern $P_i$ between the k-th registered face image and the search face image in step S44. Then, the process proceeds to step S46.

In a case where no abnormal value exists in the area excluding the area pattern $P_i$ (NO in S43), processor 101 determines whether or not the area pattern $P_i$ is a pattern representing the entire face area in step S45. Since the area pattern $P_i$ is prepared in advance, it is known whether or not the area pattern $P_i$ is a pattern indicating the entire face area. For example, in the present embodiment, the area pattern $P_0$ is a pattern indicating the entire face area as shown in FIGS. 8 and 9.

In a case where the area pattern $P_i$ is a pattern representing the entire face area (YES in S45), processor 101 calculates the similarity in the area pattern $P_i$ between the k-th registered face image and the search face image in step S44.

Specifically, processor 101 calculates the similarity by normalized correlation using the feature quantity included in the collation target area indicated by the area pattern $P_i$ in each of the k-th registered face image and the search face image.

As an example, the calculation example of the normalized correlation in the case of the area pattern $P_0$, that is, the pattern representing the entire face area is shown in Expression (2).

$$H_k = \frac{\sum_{i=1}^{N_1} f_{r,k}(i) \times f_s(i)}{\sqrt{\sum_{i=1}^{N_1} f_{r,k}(i)^2 \times \sum_{i=1}^{N_1} f_s(i)^2}} \qquad \text{Expression (2)}$$

In Expression (2), $f_{r,k}(i)$ is the i-th feature quantity in the k-th registered face image, and $f_s(i)$ is the i-th feature quantity in the search face image.

In the calculation example of the normalized correlation shown in Expression (2), since the area pattern is a pattern representing the entire face area, the sum of all feature quantities of number of dimensions $N_1$ is calculated. In the case where the area pattern is not a pattern representing the entire face area, the sum of the feature quantities included in the collation target area indicated by the area pattern is calculated in the normalized correlation.

Calculation of similarity is not limited to the normalized correlation, but may be another well-known method such as the distance between two feature quantities.

In a case where the area pattern $P_i$ is not a pattern representing the entire face area (NO in S45), the process proceeds to step S46.

In the case of the registered face images in which an abnormal value exists in an area excluding the area pattern $P_i$ or a case where the area pattern $P_i$ represents the entire face area by the iterative process from steps S42 to S46, the similarity in the area pattern $P_i$ between the registered face image and the search face image is calculated.

In step S47, processor 101 sorts the registered face images in descending order of the calculated similarity, and the face search process in the area pattern $P_i$ ends.

By the face search process shown in FIG. 10, processor 101 calculates the similarity in the area pattern $P_i$ between the registered face images and the search face image, and acquires the face search result which sorted out the registered face images in descending order of the calculated similarity.

At this time, processor 101 determines whether or not an abnormal value exists in the area excluding the area pattern $P_i$ and does not calculate the similarity of the registered face image in which no abnormal value exists in the area excluding the area pattern $P_i$, with the search face image in step S43. As a result, processor 101 can reduce the number of registered face images to be subjected to similarity calculation, so that the process load can be reduced.

[2-4. Display Example]

As shown in step S5 of FIG. 2, the face search result for each area pattern $P_i$ acquired by the face search process in the area pattern $P_i$, that is, the registered face images sorted out in descending order of the similarity, are displayed for each area pattern $P_i$. A display example of the face search result will be described with reference to FIG. 11.

Figure 11:
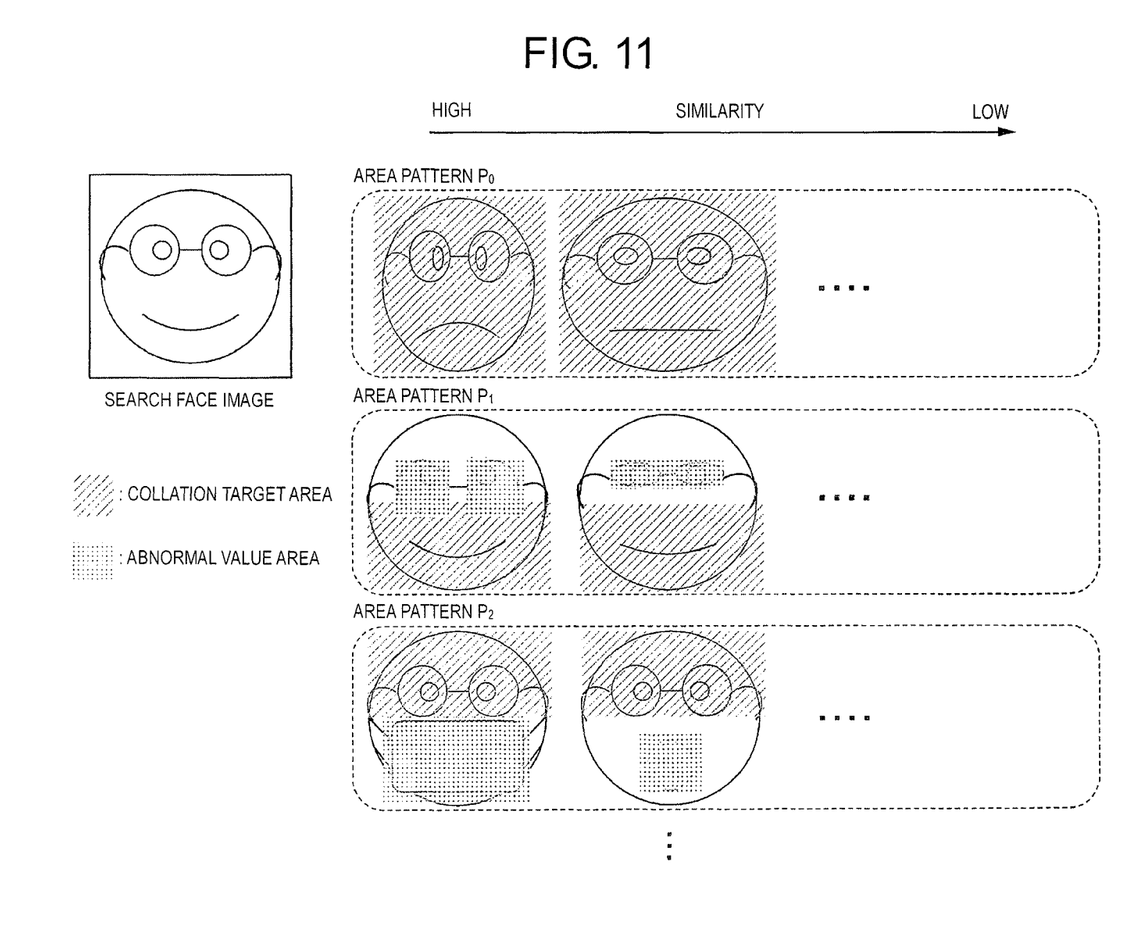
FIG. 11 shows a display example of a face search result.

FIG. 11 shows a display example of a face search result. In the display example of FIG. 11, the search face image is displayed on the left side and the face search result for each area pattern $P_i$ is displayed on the right side. As described above, the face search result is a registered face images sorted in descending order of the similarity for each area pattern $P_i$. In the display example of FIG. 11, the registered face images having a high degree of similarity are displayed in a row in order from the left side.

In the display example of FIG. 11, the face search result of the area pattern $P_0$ is displayed at the top. The face search results of the area pattern $P_1$ and the face search results of the area pattern $P_2$ are sequentially displayed under the face search result of the area pattern $P_0$.

Since the entire face of the area pattern $P_0$ is the collation target area, the face search result of the area pattern $P_0$ is the result of the overall collation in which the entire face is collated as the collation target area. On the other hand, since the area pattern $P_1$ to area pattern $P_2$ are areas excluding a partial area from the entire face as the collation target region, the face search result of the area pattern $P_1$ and the face search result of the area pattern $P_2$ are the result of partial collation in which an area excluding the partial area from the entire face is collated as a collation target area.

In FIG. 11, a collation target area corresponding to the area pattern $P_i$ and an abnormal value area indicating an area including an abnormal value in each of the registered face images are displayed in different display modes (for example, different colors), and are superimposed and displayed so as to transmit each of the registered face images. For example, processor 101 refers to the registered face image database shown in FIG. 6 and sets an area including an abnormal value of each registered face image as an abnormal value area. With such a display, in each of the registered images, the range to be collated and the range including the abnormal value can be displayed together.

In FIG. 11, an example in which the collation target area and the abnormal value area are superimposed on the registered face image is shown. However, processor 101 may not superimpose the collation target area and the abnormal value area on the registered face image to display it.

When displaying the display example as shown in FIG. 11, processor 101 may control display in order not to display the same registered face images as the registered face image displayed as a result of the face search process in the area pattern $P_m$ (m is an integer of 0 or more and P−1 or less) as the result of the face search process in the area pattern $P_n$ (n is an integer different from m and is 0 or more and P−1 or less). That is, processor 101 may control display so that one registered face image is displayed at most once and not displayed twice or more. For example, processor 101 may add additional information indicating that it is already displayed in the database relating to the registered face images displayed once, and perform this display control with reference to the additional information.

Although not shown in FIG. 11, processor 101 may further display the face search results of other area patterns. Processor 101 may display the face search result of at least one area pattern among the area pattern $P_1$ to area pattern $P_{P-1}$.

[3. Effects and the Like]

In the related art, in a face search performed between a registered face image and a face image to be searched, the collation is performed based on the height of the collation score such as the similarity between feature quantities of the entire face acquired from each face image. However, abnormal values may occur in the feature quantity due to the influence of an object (shielding object) shielding the face such as sunglasses and/or a mask or the like, or due to an influence such as a halation or a black defects due to an extreme lighting environment. In such a case, since the collation score is not appropriately calculated because information on a partial area of the face image is lost, there is a possibility that the accuracy of the face search deteriorates. Collator 100 according to the present embodiment performs a partial collation in which an area excluding a partial area in a face image is collated as a collation target and displays the result of partial collation. Accordingly, for example, a feature quantity indicating an abnormal value can be excluded from collation in the collation of the registered face image with the search face image, so that degradation of accuracy of face search is suppressed and can display the search result with high reliability.

In the present embodiment, an example in which the face search process is performed for each of the area pattern $P_0$ to area pattern $P_{P-1}$ has been described, but the present disclosure is not limited thereto. Processor 101 may select at least one area pattern in the area pattern $P_0$ to area pattern $P_{P-1}$ and perform the face search process of the selected area pattern. For example, processor 101 may select at least one area pattern based on an instruction from a user acquired via inputter 103.

Alternatively, processor 101 may determine an area that does not include abnormal values in each of the registered face images, and may select the area pattern in which the determined area corresponds to the area having the largest number among the registered face images. For example, in a case where processor 101 determines that the number of registered face images with abnormal values existing in the areas corresponding to the right eye and the left eye is the largest, processor 101 selects an area that does not include areas corresponding to the right eye and the left eye, that is, the area pattern P₁ shown in FIG. 9.

In the present embodiment, an example in which processor 101 of collator 100 performs the face registration process has been described, but the present disclosure is not limited thereto. The face registration process may be performed by a device or the like different from collator 100. In this case, processor 101 of collator 100 may acquire the result of the face registration process as shown in FIG. 6, for example, via inputter 103, and may perform the face search process based on the acquired result of the face registration process.

In the present embodiment, an example in which processor 101 of collator 100 performs the search face feature quantity calculation process has been described, but the present disclosure is not limited thereto. The search face feature quantity calculation process may be performed by a device or the like different from collator 100. In this case, processor 101 of collator 100 may acquire the feature quantity of the search face image acquired by the search face feature quantity calculation process via inputter 103, and may perform the face search process based on the feature quantity of the search face.

In the present embodiment, it is determined whether or not the feature quantity of the registered face image includes an abnormal value, but the present disclosure is not limited thereto. For example, it may be determined whether or not the feature quantity of the search face image includes an abnormal value. In this case, as in the case of the registered face image, the determination whether or not the search face image contains an abnormal value is made by comparing with the arbitrary data set. In a case where it is determined that the feature quantity of the search face image includes an abnormal value, collation with the registered face image may be performed excluding the area including the abnormal value, or the search face image may prompt re-input. In the case of prompting the re-input of the search face image, by presenting the area including the abnormal value, the user of collator 100 may be prompted to use the search face image from which the cause of occurrence of the abnormal value has been eliminated.

Since the above-described embodiment is for illustrating the technique in the present disclosure, it is possible to make various changes, substitutions, additions, omissions, and the like within the scope of claims or the equivalent thereof.

INDUSTRIAL APPLICABILITY

The present disclosure is suitable for a collator and a method for displaying a result of collation for collating a registered face image and a search face image.

REFERENCE MARKS IN THE DRAWINGS

100 COLLATOR
101 PROCESSOR
102 STORAGE UNIT
103 INPUTTER
104 DISPLAY
105 IMAGER
106 BUS

The invention claimed is:
1. A collator comprising:
at least one processor; and
a storage unit that stores a plurality of registered face images,
wherein the processor performs a partial collation for collating a feature quantity of a first target area excluding a partial area in each of the plurality of registered face images with a feature quantity of a second target area excluding a partial area in a search face image to be searched, and displays a result of the partial collation,
wherein the processor performs an overall collation for collating a feature quantity of an entire area in the search face image with a feature quantity of an entire area in each of the plurality of registered face images, and displays a result of the overall collation in distinction from the result of the partial collation.

2. The collator of claim 1,
wherein the processor displays each of the plurality of registered face images, other than each of the plurality of registered face images displayed as the result of the overall collation, among the plurality of registered face images, as the result of the partial collation.

3. The collator of claim 1,
wherein the first target area and the second target area include the same face part.

4. The collator of claim 1, wherein the processor displays each of the plurality of registered face images in a row in descending order of similarity indicated by the result of the partial collation.

5. The collator of claim 1,
wherein the processor displays a display indicating the first target area with the result of the partial collation.

6. The collator of claim 1, wherein the processor displays each of the plurality of registered face images at most once.

7. A collator comprising:
at least one processor; and
a storage unit that stores a plurality of registered face images,
wherein the processor performs a partial collation for collating a feature quantity of a first target area excluding a partial area in each of the plurality of registered face images with a feature quantity of a second target area excluding a partial area in a search face image to be searched, and displays a result of the partial collation, and
wherein the processor determines whether or not an area in which the feature quantity is an abnormal value is included in each of the plurality of registered face images based on a comparison with a data set, and excludes the area including the abnormal value in each of the plurality of registered face images from a target of the partial collation.

8. The collator of claim 7, wherein the processor determines an area not including the abnormal value in each of the plurality of registered face images, and selects an area including a largest number of areas determined not to include the abnormal value as the first target area.

9. The collator of claim 7, wherein the collator holds a plurality of area patterns, which are candidates for a target area of the partial collation, in advance, wherein each of the plurality of area patterns is an area excluding a different area from an entire face, and wherein the processor selects, as the first target area, a plurality of area patterns from which the area including the abnormal value is excluded among the plurality of area patterns, so that the area including the abnormal value is excluded from the partial collation target.

10. The collator of claim 9, wherein, in a case where there are a plurality of the area patterns in which the area including the abnormal value is excluded, the processor selects, as the first target area, an area pattern having a largest number of areas not including the abnormal value.

11. The collator of claim 9,
wherein, in a case where the processor is unable to exclude the area including the abnormal value from the partial collation target using any of the plurality of area patterns, the processor performs collation on the entire face and displays the result of collation of an entire face image.

12. The collator of claim 9, wherein each of the plurality of area patterns includes at least one face part.

13. The collator of claim 12, wherein an area excluded in each of the plurality of area patterns is a predetermined size area including at least one face part.

14. The collator of claim 13, wherein the plurality of area patterns include at least one area out of an upper part area obtained by horizontally dividing a face area into two parts, a lower part area obtained by horizontally dividing the face area into two parts, a left part area obtained by vertically dividing the face area into two parts, and a right part area obtained by vertically dividing the face area into two parts.

15. The collator of claim 9,
wherein the processor detects the face part from each of the plurality of registered face images, and performs normalization on each of the plurality of registered face images based on the detection result of the face part before the area including the abnormal value is excluded from the partial collation target, and
wherein each of the plurality of area patterns is an area corresponding to each of the plurality of normalized registered face images.

16. The collator of claim 9,
wherein the processor divides each of the plurality of registered face images for each of the plurality of area patterns used for the partial collation, and displays each of the plurality of registered face images in a row in descending order of similarity indicated by the result of the partial collation.

17. The collator of claim 16,
wherein the processor displays information indicating the area pattern used for the partial collation with each of the plurality of registered face images.

18. A collator comprising:
at least one processor; and
a storage unit that stores a plurality of registered face images,
wherein the processor performs a partial collation for collating a feature quantity of a first target area excluding a partial area in each of the plurality of registered face images with a feature quantity of a second target area excluding a partial area in a search face image to be searched, and displays a result of the partial collation, and
wherein the first target area is at least one area out of an upper part area obtained by horizontally dividing a face area into two parts, a lower part area obtained by horizontally dividing the face area into two parts, a left part area obtained by vertically dividing the face area into two parts, and a right part area obtained by vertically dividing the face area into two parts.

19. A method for displaying a result of collation, the method comprising:
performing, by a processor, a partial collation for collating a feature quantity of a first target area excluding a partial area in each of a plurality of registered face images with a feature quantity of a second target area excluding a partial area in a search face image to be searched;
displaying, by the processor, a result of the partial collation;
performing, by the processor, an overall collation for collating a feature quantity of an entire area in the search face image with a feature quantity of an entire area in each of the plurality of registered face images; and
displaying, by the processor, a result of the overall collation in distinction from the result of the partial collation.

20. A method for displaying a result of collation, the method comprising:
performing, by a processor, a partial collation for collating a feature quantity of a first target area excluding a partial area in each of a plurality of registered face images with a feature quantity of a second target area excluding a partial area in a search face image to be searched;
displaying, by the processor, a result of the partial collation; and
determining, by the processor, whether or not an area in which the feature quantity is an abnormal value is included in each of the plurality of registered face images based on a comparison with a data set, and excluding the area including the abnormal value in each of the plurality of registered face images from a target of the partial collation.

21. A method for displaying a result of collation, the method comprising:
performing, by a processor, a partial collation for collating a feature quantity of a first target area excluding a partial area in each of a plurality of registered face images with a feature quantity of a second target area excluding a partial area in a search face image to be searched; and
displaying, by the processor, a result of the partial collation,
wherein the first target area is at least one area out of an upper part area obtained by horizontally dividing a face area into two parts, a lower part area obtained by horizontally dividing the face area into two parts, a left part area obtained by vertically dividing the face area into two parts, and a right part area obtained by vertically dividing the face area into two parts.

* * * * *